Figure 1:
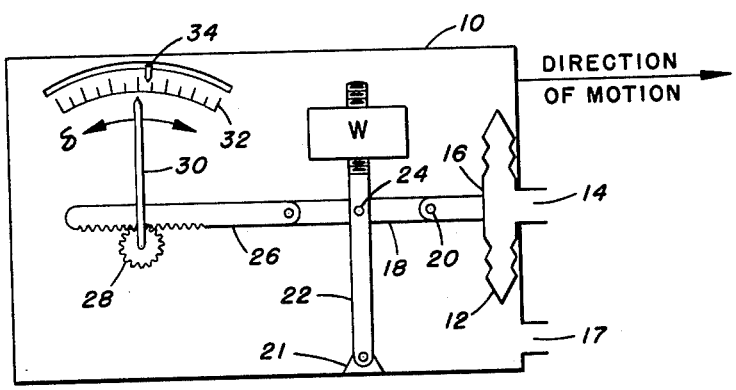

Feb. 9, 1965   F. J. BAILEY, JR., ETAL   3,168,827
AIRPLANE TAKE-OFF PERFORMANCE INDICATOR
Filed Sept. 16, 1955   2 Sheets-Sheet 1

INVENTORS
FREDERICK J. BAILEY, JR.
JOSEPH W. WETMORE

BY
ATTORNEYS

Feb. 9, 1965  F. J. BAILEY, JR., ETAL  3,168,827
AIRPLANE TAKE-OFF PERFORMANCE INDICATOR
Filed Sept. 16, 1955  2 Sheets-Sheet 2

INVENTORS
FREDERICK J. BAILEY, JR.
JOSEPH W. WETMORE
BY
ATTORNEYS

United States Patent Office 3,168,827
Patented Feb. 9, 1965

3,168,827
AIRPLANE TAKE-OFF PERFORMANCE
INDICATOR
Frederick J. Bailey, Jr., Yorktown, and Joseph W. Wetmore, Hampton, Va., assignors, by mesne assignments, to the United States of America as represented by the Administrator of the National Aeronautics and Space Administration
Filed Sept. 16, 1955, Ser. No. 534,901
8 Claims. (Cl. 73—178)
(Granted under Title 35, U.S. Code (1952), sec. 266)

The invention described herein may be manufactured and used by or for the Government of the United States of America for governmental purposes without the payment of any royalties thereon or therefor.

The present invention relates to an airplane take-off performance indicator, and more particularly to an indicator in which immediate indication is given of a malfunction of the airplane during take-off.

At present, pilots rely on engine instruments to determine whether thrust output is adequate for take-off purposes. However, present engine instruments do not necessarily provide an infallible indication of thrust output. In addition, with a large, multi-engine airplane, it is presently the practice to monitor as many as eight or even twelve engine instruments to check the operation of all engines. Furthermore, no instrument is presently available by which a pilot can detect an increase in resistance of the airplane, such as would be caused by dragging wheel brakes or and increase in air drag, either of which might jeopardize the take-off.

It is therefore an object of the present invention to provide an instrument which indicates whether the excess thrust is up to normal during take-off.

It is a further object of the present invention to provide an instrument which will indicate a malfunction resulting in reduced engine thrust or increased resistance during take-off at the earliest possible moment.

Another object of the present invention is to provide an instrument which may be readily adjusted for different take-off weights.

Yet another object of the invention is the provision of an instrument whereby altitude and temperature variations may be pre-set into the instrument.

Still another object is to provide an instrument wherein the pilot or flight engineer will be able to readily determine if a deficiency in excess thrust is too great to permit continued normal take-off procedures and operations.

Figure 3:
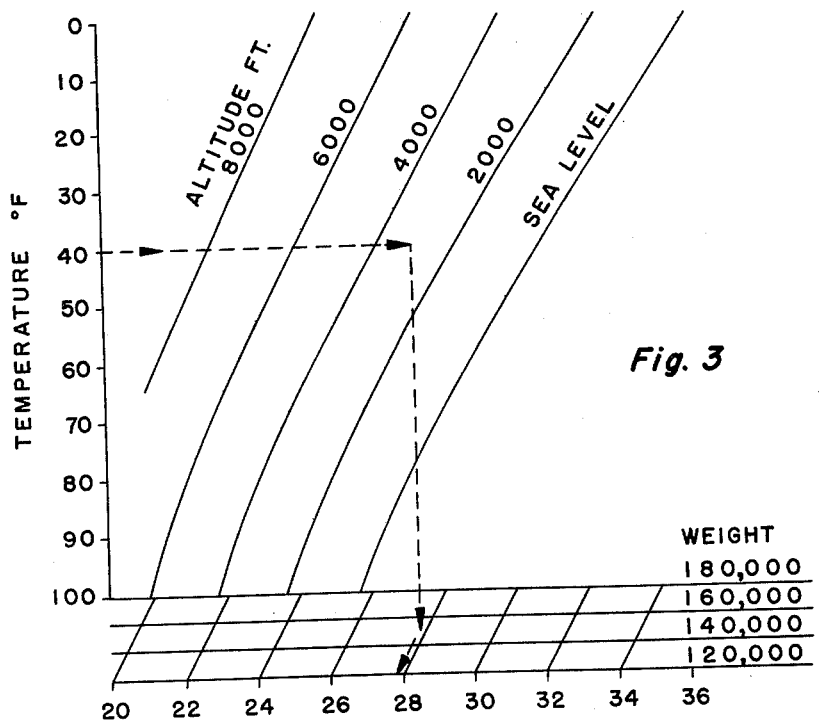
Figure 2:
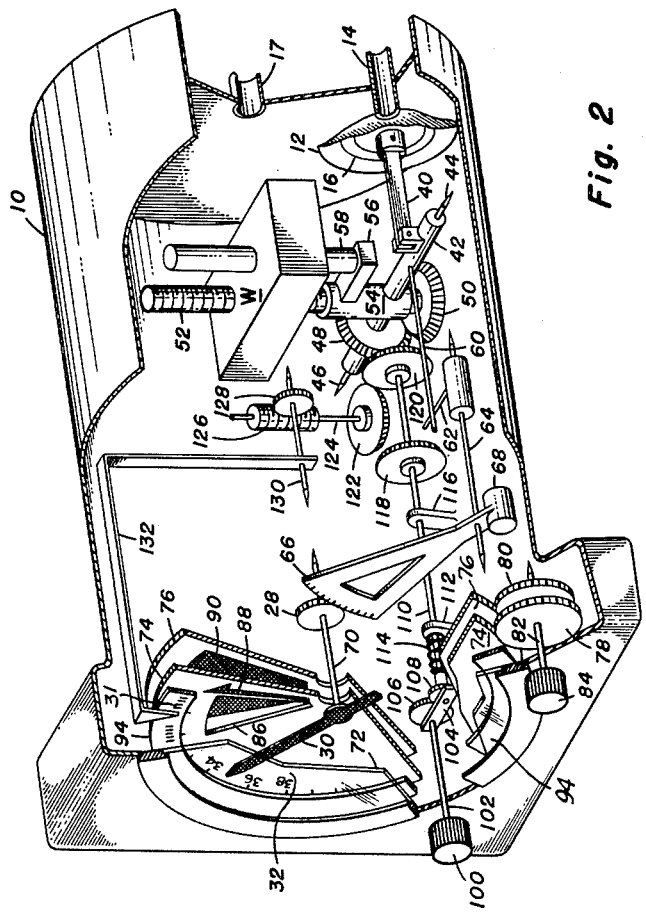

Other objects and many of the attendant advantages of this invention will be readily appreciated as the same becomes better understood by reference to the following detailed description when considered in connection with the accompanying drawings wherein:

FIG. 1 is a view illustrating the underlying operational principle of the invention, FIG. 2 is a perspective view, with parts broken away of a preferred embodiment of the invention, and FIG. 3 shows a chart which may conveniently be used in setting the inventive instrument.

Referring now to the drawings, wherein like reference characters designate like parts throughout the several views, there is shown in FIG. 1 a housing 10, at one end of which there is a spring bellows 12 having an inlet 14 and a moveable wall 16. There is also provided in housing 10 an inlet 17 which admits static air pressure into housing 10. The inlet 14 to bellows 12 is connected to the airspeed system of the aircraft, and serves to introduce total pressure into the bellows 12.

Fixed to moveable wall 16 of bellows 12 is a link 18, mounted for movement about pivot 20. Attached to the bottom of housing 10 at pivot 21 is a lever 22, on the upper end of which is movably mounted a weight W. At an intermediate point on lever 22, a pivot 24 connects it with link 18.

At the end remote from the bellows 12, link 18 is pivotally connected to a rack 26, which meshes with a gear 28 to which is fixedly attached a needle 30, placed adjacent a dial 32, having an adjustable reference marker 34.

In order to understand the underlying theory leading to the construction of the instrument herein, it is necessary to consider the equation of motion of the airplane during take off, which is:

$$\frac{W}{g}a = F_0 - \mu W - f_{D_e} q \qquad (1)$$

where:

W is airplane weight
g is acceleration due to gravity
a is forward acceleration
$F_0$ is static thrust
$\mu$ is coefficient of rolling friction
$f_{D_e}$ is the effective drag area of the air plane (including effects of thrust and rolling friction decrements with forward speed)
q is impact pressure This equation indicates that the accelerating force on an airplane of weight W is equal to the static thrust minus rolling friction minus aerodynamic drag. The above equation may be rearranged as follows $$\frac{a}{g} + \frac{f_{D_e}}{W}q = \frac{F_0 - \mu W}{W} \qquad \frac{a}{g} + \frac{f_{D_e}}{W}q = \frac{F_0 - \mu W}{W} \qquad (2)$$

The factors in the right hand side of Equation 2 may be taken as constant during a take-off run, that is, the airplane weight W, the friction coefficient $\mu$, and the static thrust $F_0$, assuming no change in the static thrust due, for instance, to engine failure. Hence, the sum of the acceleration and the product $$\frac{f_{D_e}}{W}q$$

will be a constant predictable value during the take-off run, again assuming no change in static thrust and no unexpected resistance. In view of this consideration, the present instrument is designed to indicate constancy of the factors of the right side of Equation 2 by utilizing the factors in the left side thereof, to thus give a constant angle of deflection of the needle 30. This relation may be expressed mathematically by the following equation:

$$K\left(\frac{a}{g} + \frac{f_{D_e}}{W}q\right) = d = \text{constant} \qquad (3)$$

where:

K is a constant
d is the deflection of a needle

It will be understood that the principle of the instrument of the present invention is to measure acceleration, $$\frac{a}{g} \text{ and } q$$

the dynamic pressure, multiplying the latter by the known constant factor $$\frac{f_{D_e}}{W}$$

adding this product to $$\frac{a}{g}$$

and producing an indicator reading (needle deflection d) proportional to this sum. This results in an instrument having a constant predictable value during a normal take-off. The equation for this instrument is:

$$d = K_1\left(\frac{wl}{b}\frac{a}{g} + K_2 q\right) = K_1 \frac{wl}{b}\left(\frac{a}{g} + \frac{K_2 b}{wl} q\right) \quad (4)$$

where:

$w$ is the weight of the accelerometer mass
$l$ is the length of the moment arm of the accelerometer
$b$ is the length of the moment arm of link 18 about pivot 21 $K_1$, $K_2$ are constants determined by the linkage system of the instrument and the characteristics of spring bellows 12

Referring to the second form of the right-hand term, Equation 4 may be seen to be similar to Equation 3. Making the instrument proportions so that $$\frac{K_2 b}{wl} = \frac{f_{D_e}}{W} \quad (5)$$

the instrument response is seen to be represented by Equation 3. Since $f_{D_e}$ for a given type of level-running tricycle or bicycle landing gear airplane in take-off attitude will generally be a fixed quantity, the only airplane variable in Equation 5 is the take-off weight W. Therefore, Equation 5 can be satisfied by the instrument for any take-off weight by making the length of moment arm $l$ adjustable, so that it may be varied to account for weight changes in accordance with the relation $$l = \frac{K_2 b}{wf_{D_e}} W \quad (6)$$

For this reason, the lever 22 is shown to be screw threaded, so that moment arm $l$ may be varied as necessary with airplane take-off weight W.

From Equations 2, 4 and 6, the reading of the instrument, needle 30, would be given by the relation $$d = \frac{K_1 K_2}{f_{D_e}}(F_0 - \mu W)$$

Hence, it may be seen that the deflection $d$ of needle 30 would be proportional to the static excess thrust, and constant during take-off, unless, as above noted, a malfunction occurs causing an increase in resistance or decrease in thrust after the take-off starts.

Since the static thrust $F_0$ is generally a function only of atmospheric temperature and pressure if the propulsion system is operating normally at a prescribed rating (again assuming $f_{D_e}$ to be constant for a given airplane) the reading that the instrument should show if the airplane is operating properly would be a predictable function of temperature, pressure and airplane weight. The predicted reading may be set on the dial by the adjustable reference marker 34. Alining of the needle 30 with marker 34 at the start of take-off, and retention of the alinement during the take-off run will indicate that the airplane is operating properly.

Referring now to FIG. 2, there is shown an instrument incorporating the above explained principles. A housing 10 is seen, partly broken away, and having therein spring bellows 12 with inlet 14 and moveable wall 16. Inlet 17 admits static air pressure into housing 10.

A link 40 is pivotally connected at one end to the moveable wall 16 of bellows 12 and at its other end is pivotally connected to a rock shaft 42. Rock shaft 42 is supported at its ends 44 and 46 by suitable bearings, not shown, and is the equivalent of pivot 21 of FIG. 1. Rock shaft 42 in turn rotatably supports a vertically placed bevel gear 48 which meshes with a horizontally placed bevel gear 50. Bevel gear 50 is fixed to a screw member 52 rotatably mounted in a sleeve 54, with sleeve 54 being secured to rock shaft 42. An arm 56 extends outwardly of sleeve 54 and supports a guide post 58, on which a weight W is adapted to slide. Weight W is internally screw threaded for reception of screw member 52.

Extending forwardly of rock shaft 42 is a rod 60 which engages a rod 62 extending from a sector rock shaft 64 supported at its ends by bearings, not shown. Attached to sector rock shaft 64 is a sector 66, counterbalanced by a weight 68 and engaging a pinion 28. Pinion 28 is fastened to needle shaft 70, carrying at its forward end an inductor needle 30.

At the forward end of housing 10 there is placed a glass 72 behind which are rotatably mounted a dial 74 and a subdial 76, subdial 76 being behind and slightly larger than dial 74. Both dial 74 and subdial 76 have teeth on their peripheries which engage with gears 78 and 80, gears 78 and 80 being mounted on a shaft 82 on the forward end of which is a knob 84. Dial 74 has a window 86 therein and a fixed reference arrow 88 thereon adjacent window 86. Arrow 88 is equivalent to marker 34 of FIG. 1. Generally behind window 86 is an area 90 forming a sector shaped indicium on subdial 76. Needle 30, area 90, and arrow 88 are preferably of a common light or dark color of such shade as to contrast sharply with the remaining instrument background.

On the dial 74 there is placed scale 32, having numbers corresponding to the numbers at the bottom of the chart shown in FIG. 3. Glass 72 carries a band 94 having a weight scale 31 thereon.

A weight adjustment knob 100 is mounted on a shaft 102 which protrudes from the face of the instrument. Shaft 102 has a plate 104 journaled thereon adjacent its end and a pinion 106 fixed thereto at its end. Pinion 106 meshes with pinion 108 fixed to shaft 110, which is supported for rotational and longitudinal movement by bearing post 112. A spring 114 surrounds shaft 110 and abuts against bearing post 112 and an extension of pinion 108. Shaft 110 is supported by a second bearing post 116 and has fixed thereon two bevel gears 118 and 120. Bevel gear 120 is adapted to mesh with and cause rotation of bevel gear 48, while bevel gear 118 is adapted to mesh with and cause rotation of bevel gear 122. Bevel gear 122 is mounted on shaft 124 which is supported by bearings, not shown, and which carries a worm 126 engaging a pinion 128. A shaft 130, supported by bearings, not shown, carries pinion 128 and weight indicator 132.

It will be apparent, as noted above, that the embodiment of the invention illustrated in FIG. 2 operates on the same principles as the explanatory basic embodiment illustrated in FIG. 1. An increase in dynamic pressure causes bellows 12 to expand, whereby movable wall 16, acting through link 40 will cause rock shaft 42 to rotate in a counter clockwise direction, as seen from end 44. Also, when the axis of the instrument is substantially parallel to the longitudinal axis of the airplane, with inlet 17 pointed towards the nose of the plane, an increase in acceleration will cause weight W to pivot about rock shaft 42, thus causing counter clockwise rotation of said shaft 42. Rotation of rock shaft 42 will cause rotation of sector rock shaft 64, through rods 60 and 62, and this in turn causes rotation of needle 30 through sector 66 and pinion 28.

Weight adjustment is accomplished by first pushing inwardly on knob 100, thus translating plate 104 and gears 106 and 108; shafts 102 and 110 are also translated; spring 114 is compressd and bevel gears 118 and 120 are meshed with bevel gears 122 and 48 respectively. Rotation of knob 100 will then cause rotation of shaft 102, pinions 106 and 108, shaft 110, bevel gears 120, 48 and 50, and screw member 52 to cause a raising or lowering of weight W on guide post 58. As bevel gear 120 meshes with bevel gear 48, bevel gear 118 meshes with bevel gear 122, and rotation thereof moves pointer 132 through worm 126 and pinion 128 along the weight scale 31 on band 94. Thus, the weight is set into the instrument and indicated by the same motion.

Additionally, the number at the bottom of the chart of FIG. 3 may, as further explained below, be set into the instrument by rotation of knob 84, which causes rotation of dial 74 and dial 76 by means of pinions 78 and 80. The proper number on scale 32, as indicated by the chart of FIG. 3, will be caused to align with the needle 30, by rotation of dial 74.

In use, as the airplane takes off, the needle 30, as indicated in connection with FIG. 1 will immediately rotate clockwise from its relative position on scale 32 to overlie arrow 88, if the excess of thrust over drag is of the proper magnitude. However, since a deficiency of excess thrust of up to about 10% may be permissible, the dial and subdial arrangement has been provided, whereby if the deficiency is no greater than say, 10%, the needle 30 will overlie the indicium area 90 on subdial 76. To this end, the difference in diameters of dial 74 and subdial 76 is such that a 10%, for example, range will be given by exposure of area 90 through window 86. The 10% referred to is, of course, 10% of the number taken from the chart of FIG. 3 and to which needle 30 points on scale 32 when dial 74 is set, as mentioned hereinabove.

In use of the instrument described herein, it was found that for practical take-off conditions, a deficiency in excess thrust at the start of a take-off run would cause a difference between the indicator needle 30 setting on scale 32, and reference arrow 88, which difference is an essentially constant percentage of the reference mark setting. As discussed hereinbefore, dials 74 and 76 are geared for rotation together and, regardless at which value of scale 32 is set under needle 30, the exposed area of sector indicium 90 viewable by the instrument operator through window 86 will always represent a fixed precentage of this value. This indicium represents a tolerance region or range within which indicator needle 30 must remain during the horizontal take-off run if the take-off distance is not to exceed the expected distance by more than a permissible prescribed percentage, this percentage being ten percent for the herein described instrument. Thus, the pilot or flight engineer will be provided with a rapidly understandable symbol of excess thrust quantity, whether it be 100% of desired amount, or deficient to such a degree as to justify aborting the take-off.

In FIG. 3 there is shown a chart which may be used to obtain the setting of arrow 88 prior to take-off. The chart of FIG. 3 is designed for a particular type airplane, and is therefore illustrative only. It takes account of the normal effects of temperature, pressure or pressure altitude, and airplane weight on the initial excess thrust, and hence on the reading the instrument should show during take-off. The process of reading the chart, in an exemplary situation, is indicated by the dashed line and arrows. The temperature is noted on the vertical scale at the left, and then a horizontal line extended to the pressure altitude. From this point a vertical line is dropped to the weight scale, until intersection is obtained with the horizontal line indicating the airplane gross weight for the particular take-off being calculated for. From this intersection, a line is drawn parallel to the slant lines in the weight scale to determine the dial setting. In the example shown, the temperature is 40° F., the pressure altitude is 3,000 feet, and the airplane gross weight is 150,000 pounds, thus giving a dial reference marker setting of 27.9 for needle 30 to point toward on scale 32. Thus, the pilot, copliot, flight engineer or other instrument operator in this take-off situation would rotate knob 84 until dial 74 is positioned relative to needle 30 so that it points to the value 27.9 on scale 32. Due to the geared relationship of dials 74 and 76, as discussed hereinbefore, indicium 90 would be visible through window 86 at this instrument setting over a distance of 2.79 units of scale 32. The instrument operator also rotates knob 100 to move pointer 132 to the aircraft weight value as indicated on scale 31.

As soon as take-off is fully underway, indicator needle 30 assumes a position (rotating clockwise as viewed in FIG. 2) overlying reference arrow 88 and under optimum conditions remains at this point throughout the horizontal take-off run. If needle 30 falls short of reference arrow 88 at any time during the take-off, it will constitute a warning that the acceleration is less than that expected and the take-off distance required will be greater than anticipated. With this information, the pilot must decide whether to continue or abort the take-off and, as long as needle 30 remains within the ten percent tolerance, as indicated by the exposed area of indicium sector 90, the decision to continue planned take-off is justified.

Thus, the instrument presents a single-dial direct-information source of the net thrust output of an aircraft during take-off, taking into account not only the engine output, but also compensating for any retarding forces that may act as a drag on the aircraft.

Obviously many modifications and variations of the present invention are possible in the light of the above teachings. It is therefore to be understood that within the scope of the appended claims the invention may be practiced otherwise than as specifically described.

What is claimed is:

1. An airplane take-off performance instrument comprising an indicator, dynamic pressure responsive means, means connecting said dynamic pressure responsive means to said indicator, said latter mentioned means comprising a first rock shaft having a projection thereon, a link connected at one end to said pressure responsive means and at its other end to said projection, a second rock shaft having a rod projecting therefrom, said first rock shaft having a rod projecting therefrom and engaging said first mentioned rod, a sector carried by said second mentioned rock shaft, an indicator shaft having a gear thereon, said sector engaging said gear, said indicator shaft carrying said indicator, whereby upon an increase in dynamic pressure said pressure responsive means will expand, causing rotation of said rockshafts and said indicator shaft to move said indicator in a first direction; longitudinal acceleration responsive means, and means operatively connecting said longitudinal acceleration responsive means to said indicator shaft to cause said indicator shaft to move in said first direction upon forward acceleration of the airplane.

2. An instrument as in claim 1, said longitudinal acceleration responsive means comprising a mass, said mass being supported by said first mentioned rock shaft whereby an increase in acceleration will cause said mass to rotate said first mentioned rock shaft.

3. An airplane take-off performance instrument comprising a rock shaft adapted to be disposed substantially transversely of the take-off flight path of the airplane, a sleeve carried by said rock shawt transversely thereof, a shaft journaled in said sleeve, said shaft having a threaded end extending beyond said sleeve, a guide post parallel to and off-set from said shaft, means supporting said guide post on said sleeve, a mass having a bore receiving said guide post and a screw threaded hole for reception of the threaded end of said shaft, means supporting first indicating means, means to transmit motion of said rock shaft to said first indicating means, second indicating means, and means to rotate said shaft and to move said second indicating means simultaneously and in proportion, whereby said mass may be moved with respect to the axis of said rock shaft and said second indicating means will indicate the position thereof, and whereby acceleration of said instrument will be indicated by said first indicating means.

4. The apparatus of claim 3, said last mentioned means comprising a gear journaled on said rock shaft, a second gear fixed to said shaft, a second shaft, said second shaft being drivingly connected to said second indicating means and carrying a gear, a third shaft mounted for rotational and longitudinal movement, said third shaft having two gears thereon spaced apart the same distance as the gear on said second shaft is from the gear journaled on said rock shaft.

5. An airplane take-off performance indicator comprising: an indicator needle, means to rotate said needle in proportion to the sum of acceleration and dynamic pressure forces acting during a take-off, a first dial having a sector-shaped window therein, an arrow on said first dial adjacent a radial portion of said window, a second dial mounted on the opposite side of said first dial from said needle, said second dial having indicium thereon of generally sector shape, and means to rotate said dials.

6. The apparatus of claim 5, said last mentioned means comprising gear teeth on the peripheries of said dials, and a pair of gears coaxially and fixedly mounted on a shaft, said gears engaging said gear teeth, whereby upon rotation of said shaft said dials will be rotated.

7. The apparatus of claim 6, said dials being of different diameters.

8. An airplane take-off performance instrument comprising a housing having a dial, a needle adapted to move in relation to said dial, a spring bellows mounted in said housing and having one face thereof movable, means to connect the interior of said bellows to a source of total pressure, means to connect the interior of said housing to a source of static pressure whereby said bellows will be expanded upon an increase in dynamic pressure, a lever in said housing, a mass on said lever remote from the pivot thereof, the axis of the pivot of said lever lying in a plane substantially perpendicular to the take-off flight path of the airplane, link means connecting the movable face of the bellows and the lever for expansion of said bellows upon an increase in acceleration of the airplane along said path, means connecting said lever to said needle to cause rotation thereof, the amount of rotation of the needle being in accordance with the formula:

$$d = K_1\left(\frac{wla}{bg} + K_2 q\right)$$

where:

$d$ is needle deflection
$w$ is the weight of the accelerometer mass
$l$ is the length of the moment arm of the accelerometer mass about said pivot
$b$ is the length of the moment arm of the link means of the bellows about said pivot
$K_1$, $K_2$ are constants determined by the linkage system of the instrument and the characteristics of the spring bellows
$q$ is dynamic pressure
$a$ is forward acceleration, and
$g$ is acceleration due to gravity References Cited by the Examiner
UNITED STATES PATENTS

| | | | |
|---|---|---|---|
| 1,885,578 | 11/32 | Boykow | 73—178 X |
| 2,139,694 | 12/38 | Reid et al. | 73—514 X |
| 2,182,706 | 12/39 | Shanley | 73—178 X |
| 2,531,492 | 11/50 | Angst | 73—179 |
| 2,538,303 | 1/51 | Findley | 73—178 |

ROBERT B. HULL, *Primary Examiner.*

ISAAC LISANN, A. D. McFADYEN, C. A. CUTTING, ROBERT L. EVANS, *Examiners.*